United States Patent
Song et al.

(10) Patent No.: US 7,561,741 B2
(45) Date of Patent: Jul. 14, 2009

(54) APPARATUS FOR OPERATING A MOBILE COMMUNICATION TERMINAL WITH INTEGRATED PHOTOGRAPHIC APPARATUS AND METHOD THEREOF

(75) Inventors: Myung Chul Song, Seoul (KR); Hyun Goo Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 721 days.

(21) Appl. No.: 10/736,959

(22) Filed: Dec. 15, 2003

(65) Prior Publication Data

US 2004/0180690 A1    Sep. 16, 2004

(30) Foreign Application Priority Data

Dec. 16, 2002    (KR) .................. 10-2002-0080469

(51) Int. Cl.
*G06K 9/46* (2006.01)
*G06K 9/00* (2006.01)
*G06K 9/22* (2006.01)

(52) U.S. Cl. .............. 382/190; 382/107; 382/118; 382/313

(58) Field of Classification Search ............. 382/313, 382/296, 254, 117, 118, 181, 190, 107; 455/566, 455/550.1, 556.1
See application file for complete search history.

(56) References Cited

U.S. PATENT DOCUMENTS

| | | | | |
|---|---|---|---|---|
| 5,878,156 | A * | 3/1999 | Okumura | 382/118 |
| 6,230,032 | B1 * | 5/2001 | Liljegren | 455/572 |
| 6,542,625 | B1 * | 4/2003 | Lee et al. | 382/118 |
| 6,611,613 | B1 * | 8/2003 | Kang et al. | 382/118 |
| 7,257,255 | B2 * | 8/2007 | Pittel | 382/187 |
| 2002/0018525 | A1 * | 2/2002 | Nishi et al. | 375/240.27 |
| 2003/0058236 | A1 * | 3/2003 | Neal | 345/213 |
| 2003/0063778 | A1 * | 4/2003 | Rowe et al. | 382/115 |
| 2003/0100261 | A1 * | 5/2003 | Gusler et al. | 455/18 |
| 2004/0012722 | A1 * | 1/2004 | Alvarez | 348/700 |
| 2004/0242280 | A1 * | 12/2004 | Hama | 455/566 |
| 2005/0221856 | A1 * | 10/2005 | Hirano et al. | 455/557 |

FOREIGN PATENT DOCUMENTS

| | | |
|---|---|---|
| JP | 3-85685 | 4/1991 |
| JP | 9-171560 | 6/1997 |
| JP | 2000-068882 | 3/2000 |
| JP | 2000285168 A | 10/2000 |
| JP | 2002-83302 | 3/2002 |
| JP | 2002-351603 | 12/2002 |
| KR | 1002378750000 | 10/1999 |
| KR | 10-2000-60745 | 10/2000 |

(Continued)

*Primary Examiner*—Bhavesh M Mehta
*Assistant Examiner*—John B Strege
(74) *Attorney, Agent, or Firm*—Lee, Hong, Degerman, Kang & Waimey

(57) ABSTRACT

A method for operating a mobile communication terminal with an integrated photographic apparatus is provided. The method comprises producing a first image from a first object with the photographic apparatus; detecting a diagnostic element within the first image; deriving at least a first value from the diagnostic element; deriving at least a first comprehensive value from the first value; determining a first difference between the first comprehensive value and a corresponding comprehensive initialization value derived from at least one initialization value; and assigning a first operational function of the mobile communication terminal to the first difference.

8 Claims, 5 Drawing Sheets

| | FOREIGN PATENT DOCUMENTS | | |
|---|---|---|---|
| KR | 10-2001-57718 | 7/2001 | |
| KR | 10-2001-74059 | 8/2001 | |
| KR | 10-2002-11851 | 2/2002 | |
| KR | 10-2002-17576 | * | 3/2002 |
| KR | 10-2002-45382 | | 6/2002 |
| KR | 10-2002-54702 | | 7/2002 |
| KR | 10-2002-57202 | | 7/2002 |

* cited by examiner

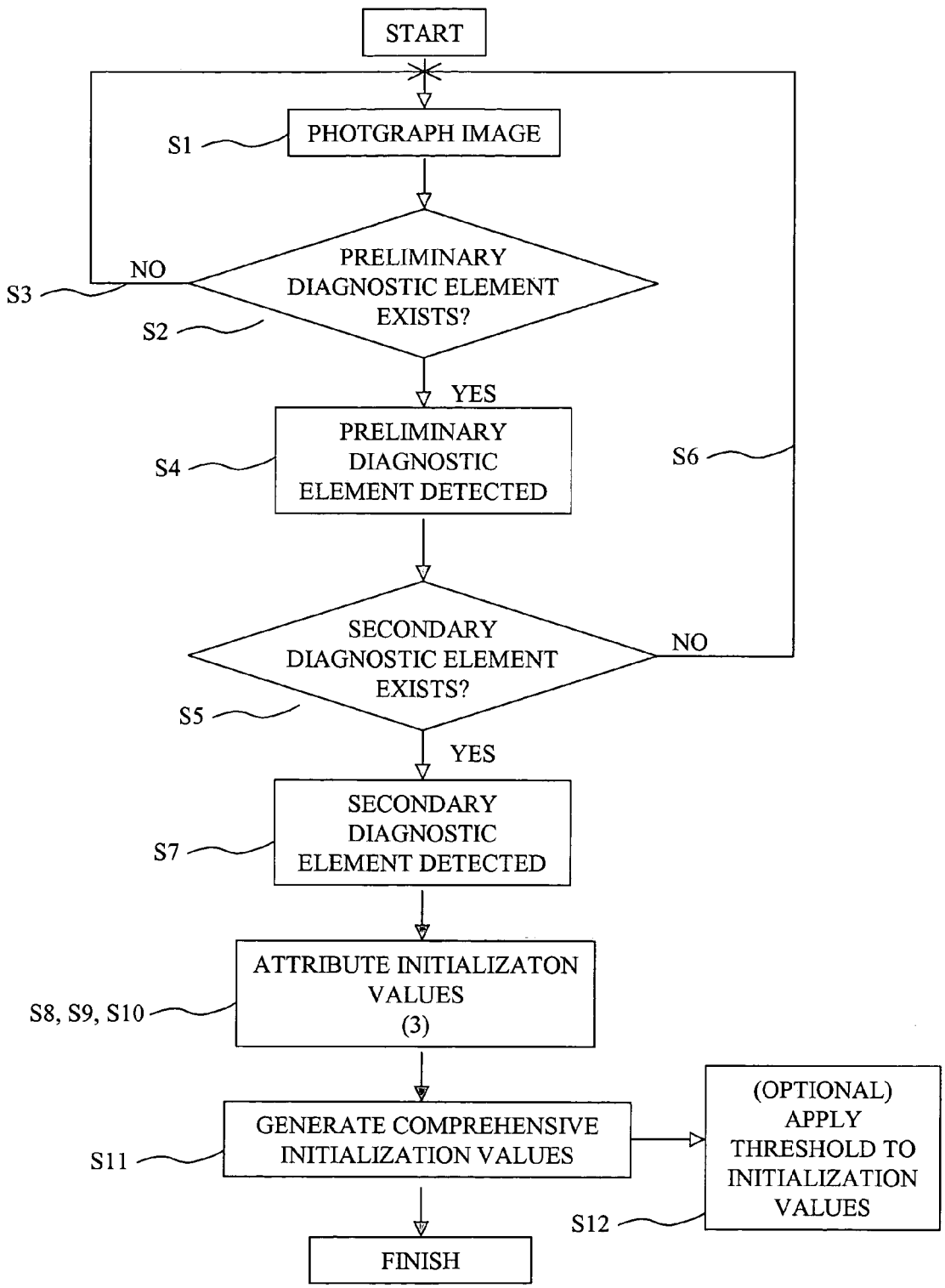

APPARATUS FOR OPERATING A MOBILE COMMUNICATION TERMINAL WITH INTEGRATED PHOTOGRAPHIC APPARATUS AND METHOD THEREOF

CROSS REFERENCE TO RELATED APPLICATIONS

Pursuant to 35 U.S.C. § 119(a), this application claims the benefit of earlier filing date and right of priority to the Korean Patent Application No. 2002-80469, filed on Dec. 16, 2002, the content of which is hereby incorporated by reference in its entirety.

BACKGROUND OF THE INVENTION

1. Field of the Invention

The present invention relates to an apparatus for operating a mobile communication terminal with an integrated photographic apparatus and method thereof, and more particularly, to an apparatus for using a photographic image to operate a mobile communication terminal with an integrated photographic apparatus and method thereof.

2. Description of Related Art

In general, mobile communication terminals include cellular phones or Personal Communication Systems (PCS) having wireless communication capabilities. As the need for video/image communication emerges along with voice communication, several types of mobile communication terminals with an integrated photographic apparatus have been suggested to satisfy this demand. Furthermore, such terminals have become increasingly complex and incorporate many features and functions which a user may find extremely difficult and complicated to operate.

Referring to FIGS. 1A and 1B, operative methods for a conventional mobile telecommunication terminal, exemplified in the form of a folding-type mobile telephone, are shown. In FIG. 1A, the user, exemplified by the hand, operates the mobile terminal by interacting with one or more of the terminal manipulation devices. In the example shown in FIG. 1A, such devices are in the form of a keypad having buttons. Due to the multiplicity functions and features in mobile terminals, each individual button is directed to a variety of functions. For example, a single button may represent 10 different characters when the mobile terminal is used for text messaging purposes.

Alternatively, the single button may represent a "short cut" key to operate a function of the terminal in quickened manner, such as taking a photographic with the integrated photographic apparatus. Ultimately, the number of functions attributed to each terminal manipulation device, which is finite, becomes limited due to acceptable ergonomics in using the mobile terminal. Attributing too many functions to a finite number of keys may result in the terminal losing overall effectiveness and popularity with respect to user-friendliness. Furthermore, as terminals technologically evolve and decrease in size, repetitive engagement of the terminal manipulation devices, which become increasingly smaller, a user will find operation of the terminal more difficult and tedious.

In FIG. 1B, a user, exemplified by the face, operates the mobile terminal via voice command, in which the user verbally communicates a command for the terminal to operate a certain function. In this example, the user states the term, "MY HOUSE," in order for the terminal to receive, process, and function in the form of dialing the user's residence. Currently, many voice commands are relegated to performing simple functions, such as dialing a telephone number. Furthermore, audibly distinct terms must be used for each stored number, thereby requiring the user to memorize such terms. This can become difficult when a specific location, such as a user's residence, has more than one telephone number associated with. Also, the number of voice commands is limited to the internal memory of the terminal, which is finite and likely decreased as the user continuously adds other functions to the terminal.

Therefore, an improved solution is needed to provide additional and alternative methods of operating mobile communication terminal.

SUMMARY OF THE INVENTION

In accordance with one embodiment, a mobile communication terminal comprises a photographic apparatus connected to the terminal; an image processing unit for processing an image produced by the photographic apparatus, wherein control information is developed from the processed image; and an operational controlling unit for corresponding an operational function of the terminal to the control information.

The image processing unit compares at least one initialization value with at least one corresponding value from the control information. The initialization value is set by a user. The image processing unit detects a first difference between the at least one initialization value and the at least one corresponding value. The control information comprises the first difference between the at least one initialization value and the at least one corresponding value processed from the image. In some embodiments, a user sets a first operational function of the terminal to correspond to the first difference.

In another embodiment, a method for operating a mobile communication terminal with integrated photographic apparatus is provided. The method comprises photographing an image; processing the image for control information; setting an operational function of the mobile communication terminal to correspond to the control information; and operating the mobile communication terminal based on the control information. The step of processing the image comprises extracting a first value from the processed image; comparing the first value to an initialization value; determining a first difference between the first value and the initialization value; developing first control information derived from the first difference; and generating a control information signal based on the first control information. In some embodiments, the method further comprises photographing an image; extracting at least one value from the image; and setting the at least one value as the initialization value.

In accordance with yet another embodiment, a method for operating a mobile communication terminal with an integrated photographic apparatus is provided. The method comprises producing a first image from a first object with the photographic apparatus; detecting a diagnostic element within the first image; deriving at least a first value from the diagnostic element; deriving at least a first comprehensive value from the first value; determining a first difference between the first comprehensive value and a corresponding comprehensive initialization value derived from at least one initialization value; and assigning a first operational function of the mobile communication terminal to the first difference.

The method may further comprise producing a second image from the first object with the photographic apparatus; detecting a diagnostic element within the second image; and deriving the at least one initialization value from the diagnostic element. At least one threshold value is applied to the comprehensive initialization value. The diagnostic element comprises a preliminary diagnostic element comprising a face featured on a head of an individual; and a secondary diagnostic element comprising a pair of eyes featured on the face of the individual.

Values are attributed to a first midpoint located between the eyes; a second midpoint located between a pair of shoulders; a vector drawn through the first and second midpoint; and an angle formed by the vector and a horizontal line joining the shoulders. The comprehensive initialization value comprises an approximate 90° angle formed by the vector and the horizontal line drawn joining the shoulders. In one embodiment, the comprehensive initialization value comprises a vector length measured when a horizontal line drawn joining eyes and containing the first midpoint is approximately parallel to the horizontal line joining the shoulders.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 4 illustrates a flow chart of a process for initialization of a mobile communication terminal with an integrated photographic apparatus according to one embodiment of the present invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to one or more embodiments of the invention, examples of which are illustrated in the accompanying drawings.

Figure 1A:
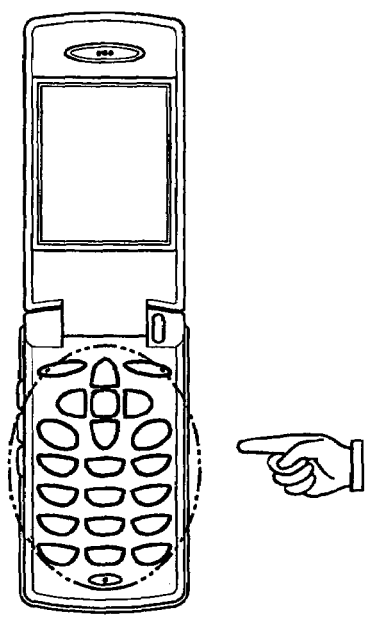
FIGS. 1A and 1B illustrate conventional methods of operating a mobile communication terminal according to the related art.
Figure 1B:
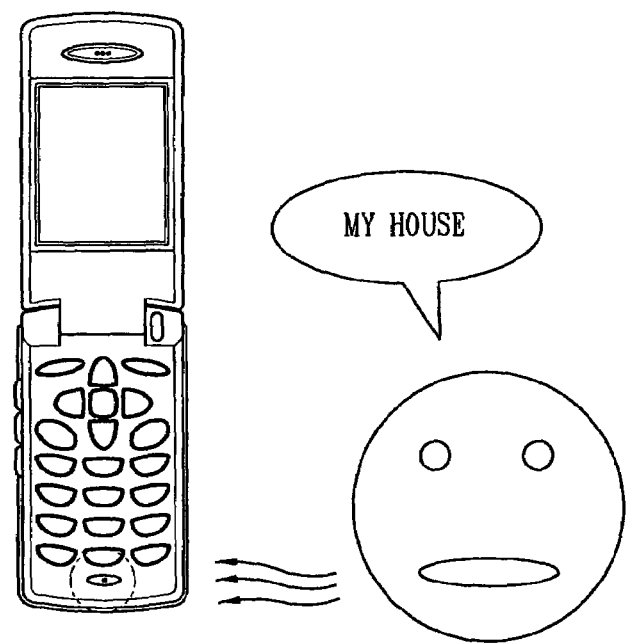
Figure 2:
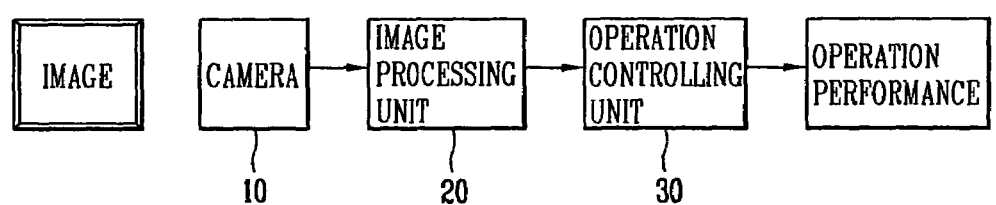
FIG. 2 illustrates a block diagram of an apparatus for operating a mobile communication terminal with an integrated photographic apparatus according to one embodiment of the present invention.

In FIG. 2, a block diagram of an apparatus for operating a mobile communication terminal with an integrated photographic apparatus, according to one embodiment of the present invention, is shown. The apparatus comprises an integrated photographic apparatus, such as a camera 10, mounted on the terminal. The camera 10 reproduces an image on a display screen (not shown) of the terminal. An image processing unit 20 installed on the terminal processes and analyzes images captured by the camera 10 to develop certain information. An operation controlling unit 30 detects the images and correlates corresponding commands to the images, thereby providing to the user operational functions for the terminal.

The camera 10 is preferably a digital camera including a sensor (not shown) to receive signals. The image processing unit 20, through the camera 10, receives image information including movements occurring in the image, such as an individual's movement of his lips, blinking of his eyes, or nodding of his head, for example. Such movements comprise a command control, wherein a command transmission, inputted by the user and received by the image processing unit 20, is correlated with the command control. A command transmission may comprise, for example, picture information, a particular alphanumeric character, or an icon. The operation controlling unit 30 detects the image processed by the image processing unit 20 and, using a predetermined algorithm (discussed in detail below), programs the processed image to operate a function of the terminal, such as scrolling a menu, inputting a selected alphanumeric character, or directing a cursor.

Figure 3:
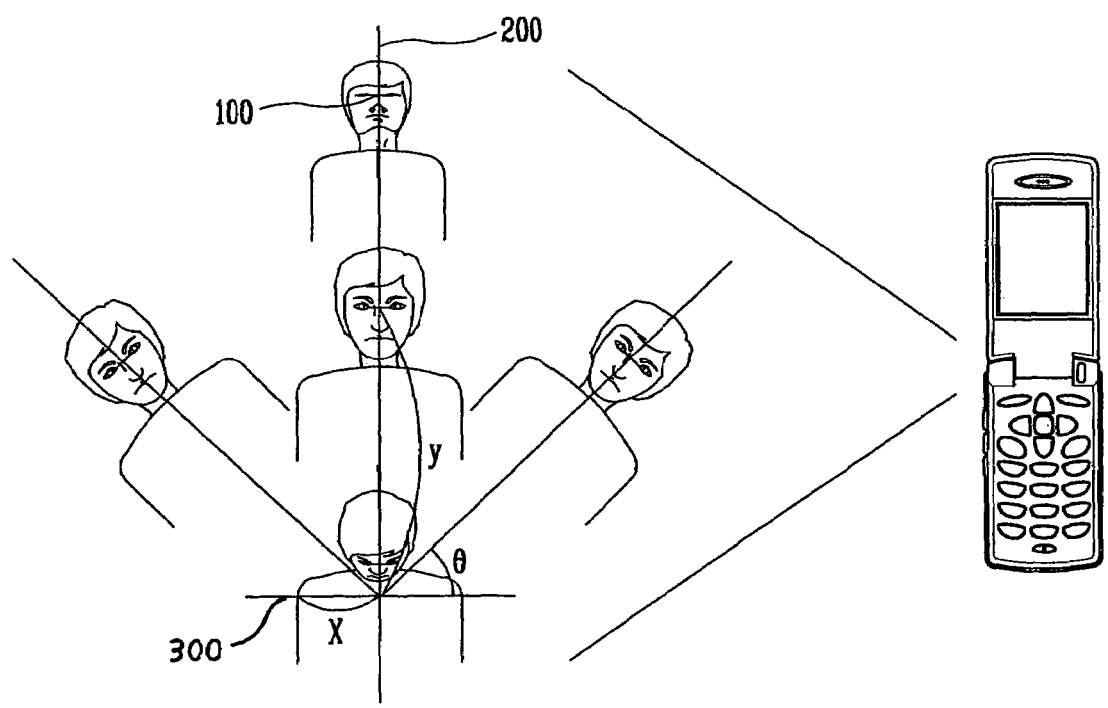
FIG. 3 illustrates a diagram of a method for operating a mobile communication terminal with an integrated photographic apparatus according to one embodiment of the present invention.

Referring to FIG. 3, the process for initializing such a function is described herein. In FIG. 3, the image of a user's head is used as an example to operate directional control of a cursor within a terminal's display. The image of the user's face is detected by the photographic apparatus integrated in the mobile communication terminal, which is exemplified on the right as a folding-type mobile terminal. Furthermore, features of the user's face are also detected. Methods for detecting and distinguishing a user's facial features include a support vector machine (SVM) algorithm of pattern matching methods, a back-propagation neural network algorithm using normalized average face color information, and other suitable methods known to one of ordinary skill in the art.

In using a SVM algorithm, an object having two categorical features is positioned in one-dimensional space, wherein the object is divided into one hyper-plane. The proper and most suitable hyper-plane is searched and determined to prevent misclassification. With respect to a back-propagation neural network algorithm, a most suitable output value is derived from selected input values and a control weight. This algorithm is more appropriate for classifying and predicting based on a model. For example, a back-propagation neural network algorithm can be used to detect a studied facial shape by using a sliding window to view a black-and-white stationary image, wherein a plurality of facial images can be extracted.

In FIG. 3, the face of an individual, such as a user, is photographed, wherein the facial region is detected from the photographed image. The individual's facial features are then separately processed. For example, the positions of the individual's eyes are detected by drawing a horizontal line 100 connecting the eyes. A vertical line 200 is drawn through a midpoint on line 100 between the individual's eyes and is extend below to serve as a Y-axis. A horizontal line 300 is drawn across the individual's shoulders to provide as an X-axis. The intersection point of lines 200 and 300 serves an origin.

Rotation of the individual's head, wherein the individual's face is moved in either the left or right directions, is measured by the angle $\theta$. Right and left movements of the individual's face are measured based on reference point located between the individual's eyes. Alternatively, the angle formed by the tilting of the individual's head in either the left or right directions, in addition to either forwards or backwards, can be measured. Accordingly, initialization values such as the lengths of lines 100 and 300, intersection points of liners 100 and 200, and of 200 and 300, the distance between intersection points, and the angle θ (initially approximately 90°), would be stored in the image processing unit 20.

The flow chart of FIG. 4 illustrates the initialization process within the image processing unit 20 with respect to the present example. At step S1, an image is photographed by the photographic apparatus or camera 10 integrated in the mobile communication terminal. When the image is inputted to the image processing unit 20, it is analyzed and processed for detectable information. For example, facial area within the image is determined in step S2. If a preliminary diagnostic element, such as a facial area, is not detected (step S3), then step S1 is repeated. If a facial area or region is detected (step S4), then more detailed information is searched and detected in step S5, where eyes are detected, for example. Similar to step S3, if information such as the eyes region is not detected (step S6), then photography is repeated in step S1.

After detecting the more detailed information (step S7), at least one initialization value is attributed to the detailed information. In the present example, three initialization values are attributed (steps S8-S10). For example, in referring to FIG. 3, a line 100 of measured length is drawn across the distance between the eyes. Another initialization value is the perpendicular line 200, which is drawn through the midpoint of line 100. An additional initialization value is the measured line 300 that is drawn across the distance between the shoulders.

In step S11 of FIG. 4, comprehensive initialization values, based upon the initialization values obtained in steps S8-S10, is generated. In the present example, the angle θ, which is formed by the vector (the intersection point of lines 200 and 300 to the intersection point of lines 100 and 200) and the either line 100 or line 200, represents a comprehensive initialization value. Furthermore, the length of the vector also represents a comprehensive initialization value. In step S12, preset thresholds may optionally be applied to each initialization value to compensate for environmental conditions and unintentional movement by the user. For example, the initialization value for the angle θ may be a range from approximately 80° to approximately 100°.

Figure 5A:
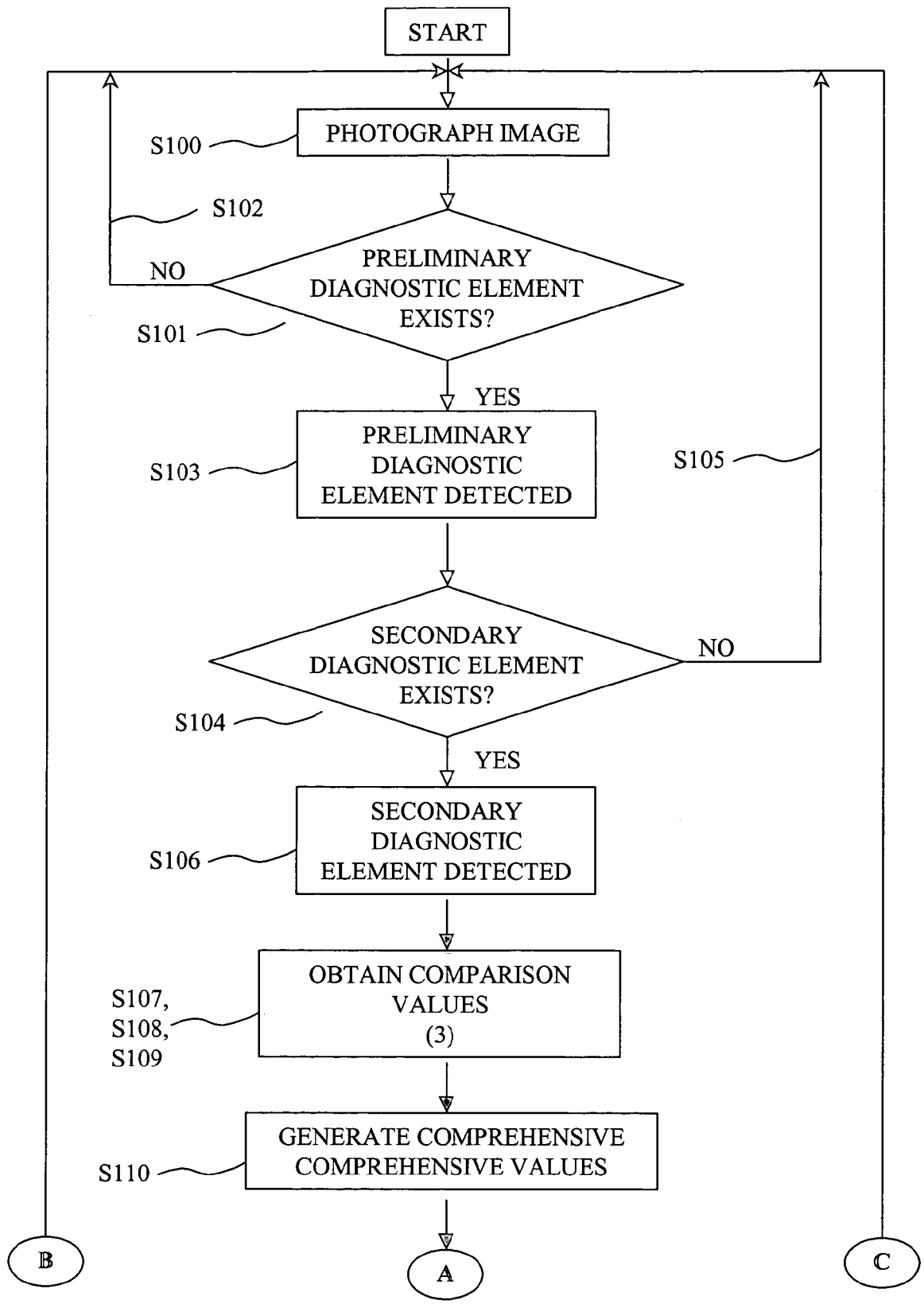
FIGS. 5A and 5B illustrate a flow chart of a process for movement detection by a mobile communication terminal with an integrated photographic apparatus according to one embodiment of the present invention.

Referring to FIG. 5A, an image is captured by a photographic apparatus mounted on the mobile communication terminal at step S100. When the image is inputted to the image processing unit 20, it is analyzed and processed for detectable information, such as facial area within the image, in step S101. If the preliminary diagnostic element such as facial area is not detected in step S102, then step S100 is repeated. If a facial area or region is detected in step S103, then more detailed information, such as the region containing eyes, is searched and detected in step S104. Should the eyes region not be detected in step S105, then photography is repeated in step S100.

After detecting the region containing the individual's eyes in step S106, a comparison value is attributed to the detailed information, where, in this example, a line of measured length is drawn across the distance between the eyes in step S101. Another comparison value, such as drawing a perpendicular line through the midpoint of line drawn in step S107, is created in step S108. An additional comparison value is generated in step S109, where a measured line is drawn across the distance between the shoulders of the individual. In step S110, comprehensive comparison values are obtained, such as by forming the angle $θ^1$ occurring between a vector and the line formed in step S109 and by measuring the length of the vector. The vector is formed from the intersecting points of the lines formed in steps S107-S109.

Figure 5B:
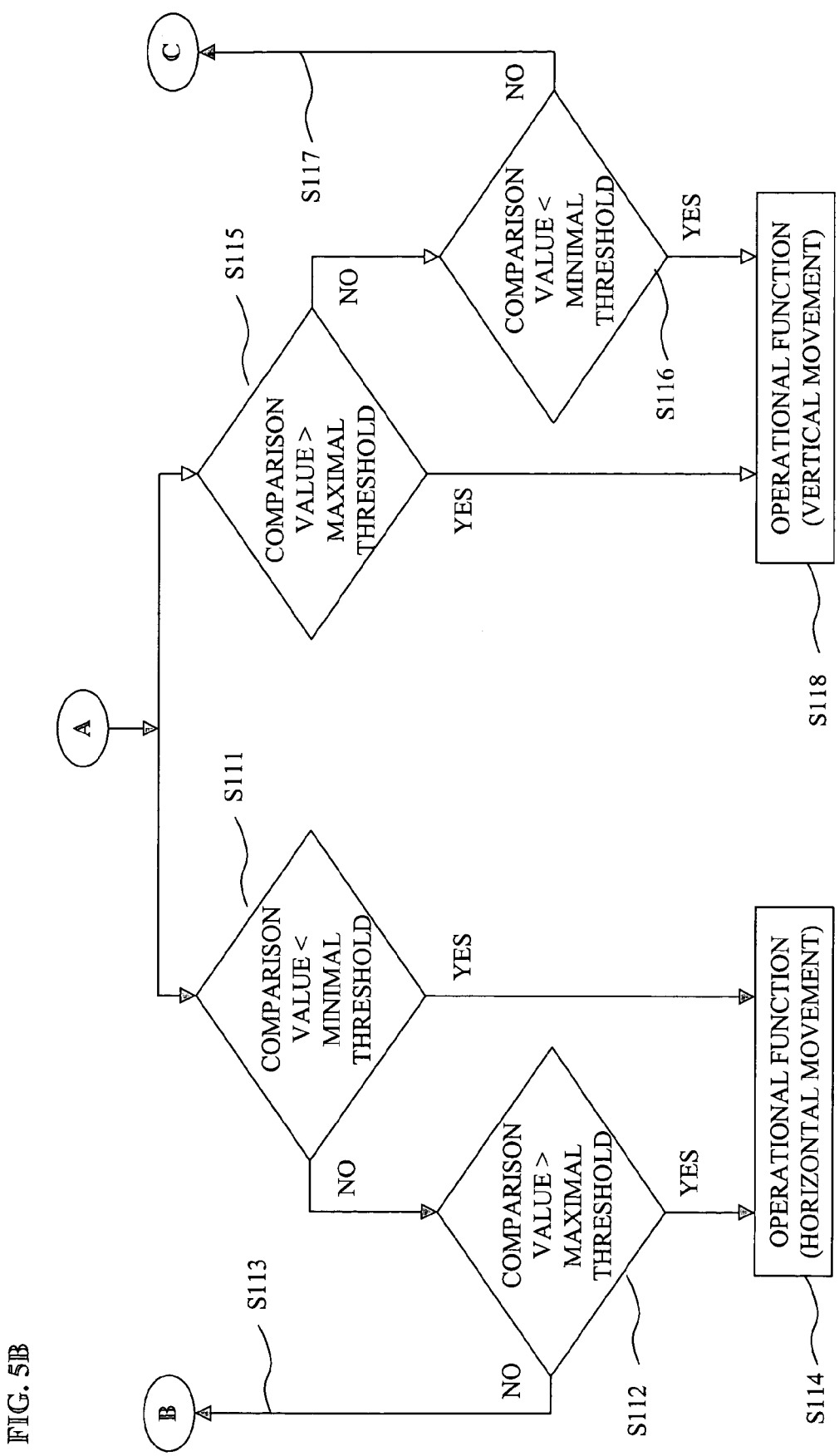

Now referring to FIG. 5B and along direction arrow A, the angle $θ^1$ is measured and compared to the initialization value of angle θ at (step S111). If the angle $θ^1$ is determined to be less than the minimum threshold (i.e., less than 80°) (step S111), then the operational function corresponding to the sensed movement (e.g., tilting of the head to the left) is conducted (step S114). For example, movement of a cursor to the left within a menu displayed on the display screen would be shown. If the angle $θ^1$ is determined to be greater than the minimum threshold (i.e., greater than 80°), then the $θ^1$ is determined whether to be greater than the maximum threshold (i.e., greater than 100°) (step S112).

If the angle $θ^1$ is determined not to be greater than the maximum threshold, then no angular and/or rotational movement is detected, wherein the process is reinitiated (step S113 along directional arrow B). If the angle $θ^1$ is determined to be greater than the maximum threshold, then the operational function corresponding to the sensed movement (e.g., tilting of the head to the right) is conducted (step S114). According to the current example, the terminal's screen would display a movement of the cursor to the right.

The vector length is also determined for deviation from the range preset in the initialization value. In step S115, if the length is determined to be greater than the maximal initialization value, then the operational function corresponding to the sensed movement (e.g., nodding of the head upwards) is conducted (step S118). In the present example, the operational function would consist of a cursor moving upwards in a display screen. If the vector length is determined not to be greater than the maximal initialization value, then the vector length is determined whether to be less than the minimal initialization value (step S116).

If the vector length is determined not to be greater than the minimal initialization value, then no vertical movement is detected, wherein the process is reinitiated (step S117 along directional arrow C). If the vector length is determined to be less than the minimal initialization value, then the operational function corresponding to the sensed movement (e.g., nodding of the head downwards) is conducted (step S118). According to the present example, the terminal's screen would display a downwards movement of the cursor.

In addition, to cursor control, the apparatus and method of the present invention, in one embodiment, can be applied to video games played on mobile terminals, wherein movements sensed and processed by the present invention can be translated to movements of the game's protagonist. Additionally, separate movements, such as eye blinking and lip movement, may be incorporated into the algorithms programmed in the apparatus of the present invention to control addition functions of the terminal. In the gaming context, tilting the head to the right while blinking would be translated into the game's character moving to the right while firing a weapon, for example. In other operational contexts, repeated nodding of the head downwards can be translated into scrolling down a menu, wherein a blink may select a telephone number, for example. This technology may be incorporated into other applications which require user interaction with a text or graphic interface.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A mobile communication terminal comprising:
a photographic apparatus connected to the terminal;
an image processing unit for processing images produced by the photographic apparatus, wherein control information is developed responsive to movement occurring in the images; and
an operational controlling unit for corresponding an operational function of the terminal to the control information,
wherein a first image is produced from an object having a first categorical feature and a second categorical feature, and a second image is produced from the object, such that a first value is attributed to a first midpoint of the first categorical feature and a second value is attributed to the second categorical feature,
wherein the image processing unit processes the images by:
extracting the first value from at least one of the processed images;
comparing the first value to an initialization value;
determining a first difference between the first value and the initialization value;
developing first control information derived from the first difference; and
generating a control information signal based on the first control information.

2. The terminal of claim 1, wherein the initialization value is set by a user.

3. The terminal of claim 2, wherein the user sets a first operational function of the terminal to correspond to the first difference.

4. A method for operating a mobile communication terminal with an integrated photographic apparatus, the method comprising:
photographing an object with the integrated photographic apparatus to produce images;
processing the images for control information;
setting an operational function of the mobile communication terminal to correspond to the control information; and
operating the mobile communication terminal based on the control information,
wherein the control information is developed responsive to movement occurring in the images,
wherein a first image is produced from an object having a first categorical feature and a second categorical feature, and a second image is produced from the object, such that a first value is attributed to a first midpoint of the first categorical feature and a second value is attributed to the second categorical feature,
wherein processing the images comprises:
extracting the first value from at least one of the processed images;
comparing the first value to an initialization value;
determining a first difference between the first value and the initialization value;
developing first control information derived from the first difference; and
generating a control information signal based on the first control information.

5. The method of claim 4, further comprising: extracting at least one value from at least one of the first or second images; and setting the at least one value as the initialization value.

6. A method for operating a mobile communication terminal with an integrated photographic apparatus, the method comprising:
producing a first image from a first object with the photographic apparatus;
detecting a first diagnostic element within the first image;
deriving at least a first value from the first diagnostic element;
deriving at least a first comprehensive value from the first value;
determining a first difference between the first comprehensive value and a corresponding comprehensive initialization value derived from at least one initialization value;
assigning a first operational function of the mobile communication terminal to the first difference;
producing a second image from the first object with the photographic apparatus;
detecting a second diagnostic element within the second image;
deriving the at least one initialization value from the second diagnostic element; and
applying at least one threshold value to the comprehensive initialization value;
wherein the second diagnostic element comprises:
a preliminary diagnostic element comprising a face featured on a head of an individual; and
a secondary diagnostic element comprising a pair of eyes featured on the face of the individual;
wherein producing the second image further comprises:
attributing a first value to a first midpoint located between the eyes;
attributing a second value to a second midpoint located between a pair of shoulders;
attributing a first comprehensive value to a vector drawn through the first and second midpoint; and
attributing a second comprehensive value to an angle formed by the vector and a horizontal line joining the shoulders.

7. The method of claim 6, wherein the comprehensive initialization value comprises an approximate 90° angle formed by the vector and the horizontal line drawn joining the shoulders.

8. The method of claim 6, wherein the comprehensive initialization value comprises a vector length measured when the horizontal line drawn joining eyes and containing the first midpoint is approximately parallel to the horizontal line joining the shoulders.

* * * * *